United States Patent
Koehler et al.

(10) Patent No.: US 9,773,627 B2
(45) Date of Patent: Sep. 26, 2017

(54) SHAPE MEMORY CIRCUIT BREAKERS

(71) Applicant: Raytheon Company, Waltham, MA (US)

(72) Inventors: Frederick B. Koehler, Tucson, AZ (US); Ward D. Lyman, Tucson, AZ (US); William D. Werries, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 721 days.

(21) Appl. No.: 14/255,562

(22) Filed: Apr. 17, 2014

(65) Prior Publication Data

US 2016/0217954 A1 Jul. 28, 2016

Related U.S. Application Data

(63) Continuation of application No. 13/155,581, filed on Jun. 8, 2011, now abandoned, which is a (Continued)

(51) Int. Cl.
- *F03G 7/06* (2006.01)
- *H01H 37/32* (2006.01)
- *H01H 37/46* (2006.01)

(52) U.S. Cl.
CPC ........... *H01H 37/323* (2013.01); *F03G 7/065* (2013.01); *H01H 37/46* (2013.01); *Y10T 29/49105* (2015.01)

(58) Field of Classification Search
CPC .... F03G 7/065; H01H 61/0107; H01H 37/32; H01H 37/323; H01H 37/46–37/50;
(Continued)

(56) References Cited

U.S. PATENT DOCUMENTS

| 4,716,731 A | 1/1988 | Sakai et al. |
| 4,839,479 A | 6/1989 | Davis, Jr. |

(Continued)

FOREIGN PATENT DOCUMENTS

| JP | 04134227 A | 5/1992 |
| JP | 2006316830 A | 11/2006 |
| WO | WO-2010068266 A1 | 6/2010 |

OTHER PUBLICATIONS

"U.S. Appl. No. 13/155,592, Response filed Apr. 17, 2014 to Notice of Allowance mailed Jan. 17, 2014", 1 pg.

(Continued)

*Primary Examiner* — Laert Dounis
(74) *Attorney, Agent, or Firm* — Schwegman Lundberg & Woessner, P.A.

(57) ABSTRACT

A shape memory circuit breaker includes a shape memory substrate having first and second opposed substrate ends. The shape memory substrate is configured to transition from a strained conductive configuration to a fractured non-conductive configuration. An isolation housing is coupled with the shape memory substrate. The isolation housing includes first and second anchors coupled near the first and second substrate ends. A brace extends between the first and second anchors, and the brace statically positions the first and second anchors and the respective first and second substrate ends. The shape memory substrate is configured to transition from the strained conductive configuration to the fractured non-conductive configuration at or above a specified temperature range corresponding to a specified overload current range or voltage range, and the first substrate end fractures from the second substrate end at or above the specified temperature range resulting in an open circuit.

11 Claims, 10 Drawing Sheets

Related U.S. Application Data continuation-in-part of application No. 12/332,004, filed on Dec. 10, 2008, now Pat. No. 8,418,455.

(58) Field of Classification Search
CPC .... H01H 39/006; H01H 71/145; H01H 75/10; H01H 77/04; H01H 2085/0004; H01H 2061/0115–2061/0122
USPC ............ 337/140, 296, 123, 139; 403/28–30; 60/527–529
See application file for complete search history.

(56) References Cited

U.S. PATENT DOCUMENTS

| | | | |
|---|---|---|---|
| 4,899,543 A | 2/1990 | Romanelli et al. | |
| 4,945,727 A | 8/1990 | Whitehead et al. | |
| 5,061,914 A | 10/1991 | Busch et al. | |
| 5,105,178 A | 4/1992 | Krumme | |
| 5,119,555 A | 6/1992 | Johnson | |
| 5,245,738 A | 9/1993 | Johnson | |
| 5,273,116 A | 12/1993 | Ross | |
| 5,440,193 A | 8/1995 | Barrett | |
| 5,722,709 A | 3/1998 | Lortz et al. | |
| 5,916,466 A | 6/1999 | Dixon | |
| 6,126,371 A | 10/2000 | McCloskey | |
| 6,247,493 B1 | 6/2001 | Henderson | |
| 6,321,654 B1 | 11/2001 | Robinson | |
| 6,352,494 B2 | 3/2002 | Mcalonan | |
| 6,622,971 B1 | 9/2003 | Robertson | |
| 6,843,465 B1 | 1/2005 | Scott | |
| 6,863,447 B2 | 3/2005 | Gilleo | |
| 6,918,545 B2 | 7/2005 | Franson et al. | |
| 7,331,616 B2 | 2/2008 | Brei et al. | |
| 7,396,182 B2 | 7/2008 | Retat et al. | |
| 7,422,403 B1 | 9/2008 | Johnson et al. | |
| 7,476,224 B2 | 1/2009 | Petrakis | |
| 7,947,937 B1 | 5/2011 | Langner | |
| 8,056,335 B1 | 11/2011 | Brown | |
| 8,172,458 B2 | 5/2012 | Petrakis | |
| 8,367,151 B2 | 2/2013 | O'brien et al. | |
| 8,418,455 B2 | 4/2013 | Lyman et al. | |
| 8,764,286 B2 | 7/2014 | Koehler et al. | |
| 8,789,366 B2 | 7/2014 | Lyman et al. | |
| 9,136,078 B1 * | 9/2015 | Woychik .............. | H01H 37/323 |
| 2002/0057148 A1 * | 5/2002 | Johnson ............... | H01H 1/0036 335/78 |
| 2002/0127384 A1 | 9/2002 | Mulligan et al. | |
| 2002/0187020 A1 | 12/2002 | Julien | |
| 2003/0128491 A1 | 7/2003 | Bueno Ruiz et al. | |
| 2005/0136270 A1 | 6/2005 | Besnoin et al. | |
| 2006/0273876 A1 | 12/2006 | Pachla et al. | |
| 2008/0034750 A1 | 2/2008 | Gao et al. | |
| 2009/0095493 A1 | 4/2009 | Johnson et al. | |
| 2009/0314890 A1 | 12/2009 | Koehler et al. | |
| 2010/0117663 A1 | 5/2010 | Herrera et al. | |
| 2010/0139264 A1 | 6/2010 | Lyman et al. | |
| 2010/0215424 A1 | 8/2010 | Crookston et al. | |
| 2011/0232278 A1 | 9/2011 | Lyman et al. | |
| 2011/0232562 A1 | 9/2011 | Koehler et al. | |
| 2011/0234362 A1 | 9/2011 | Koehler et al. | |

OTHER PUBLICATIONS

"U.S. Appl. No. 12/332,004, Corrected Notice of Allowability mailed Mar. 27, 2012", 2 pgs.
"U.S. Appl. No. 12/332,004, Examiner Interview Summary mailed Jan. 24, 2012", 3 pgs.
"U.S. Appl. No. 12/332,004, Examiner Interview Summary mailed Aug. 10, 2012", 3 pgs.
"U.S. Appl. No. 12/332,004, Final Office Action mailed Oct. 20, 2011", 9 pgs.
"U.S. Appl. No. 12/332,004, Non Final Office Action mailed Apr. 6, 2012", 8 pgs.
"U.S. Appl. No. 12/332,004, Non Final Office Action mailed May 10, 2011", 8 pgs.
"U.S. Appl. No. 12/332,004, Notice of Allowance mailed Dec. 13, 2012", 6 pgs.
"U.S. Appl. No. 12/332,004, Response filed Jan. 20, 2012 to Final Office Action mailed Oct. 20, 2012", 7 pgs.
"U.S. Appl. No. 12/332,004, Response filed Aug. 2, 2012 to Non Final Office Action mailed Apr. 6, 2012", 10 pgs.
"U.S. Appl. No. 12/332,004, Response filed Jul. 20, 2011 to Non Final Office Action mailed May 10, 2011", 7 pgs.
"U.S. Appl. No. 13/155,575, Applicant's Summary of Examiner Interview filedDec. 12, 2013", 1 pg.
"U.S. Appl. No. 13/155,575, Final Office Action mailed Dec. 26, 2013", 15 pgs.
"U.S. Appl. No. 13/155,575, Non Final Office Action mailed Aug. 15, 2013", 11 pgs.
"U.S. Appl. No. 13/155,575, Notice of Allowance mailed Apr. 11, 2014", 11 pgs.
"U.S. Appl. No. 13/155,575, Preliminary Amendment filed Jun. 29, 2011", 3 pgs.
"U.S. Appl. No. 13/155,575, Response filed Mar. 25, 2014 to Final Office Action mailed Dec. 26, 2013", 13 pgs.
"U.S. Appl. No. 13/155,575, Response filed Jun. 21, 2013 to Restriction Requirement mailed May 23, 2013", 7 pgs.
"U.S. Appl. No. 13/155,575, Response filed Nov. 7, 2013 to Non Final Office Action mailed Aug. 15, 2013", 17 pgs.
"U.S. Appl. No. 13/155,575, Restriction Requirement mailed May 23, 2013", 10 pgs.
"U.S. Appl. No. 13/155,581, Examiner Interview Summary mailed Feb. 3, 2014", 3 pgs.
"U.S. Appl. No. 13/155,581, Final Office Action mailed Oct. 25, 2013", 31 pgs.
"U.S. Appl. No. 13/155,581, Non Final Office Action mailed Apr. 4, 2013", 27 pgs.
"U.S. Appl. No. 13/155,581, Response filed Jul. 13, 2013 to Non Final Office Action mailed Apr. 4, 2013", 23 pgs.
"U.S. Appl. No. 13/155,592, Non Final Office Action mailed Sep. 18, 2013", 6 pgs.
"U.S. Appl. No. 13/155,592, Notice of Allowance mailed Jan. 17, 2014", 7 pgs.
"U.S. Appl. No. 13/155,592, Response filed Nov. 26, 2013 to Non Final Office Action mailed Sep. 18, 2003", 9 pgs.
"International Application Serial No. PCT/US2009/06471, International Preliminary Report on Patentability mailed Jun. 23, 2011", 7 pgs.
"International Application Serial No. PCT/US2009/06471, Search Report mailed Mar. 11, 2010", 3 pgs.
"International Application Serial No. PCT/US2009/06471, Written Opinion mailed Mar. 11, 2010", 9 pgs.
Braun, Simon G, "Encyclopedia of Vibration", vols. 1-3. Elsevier, (2002), 1145 -1148.
Roberto, G., "A non-pyrotechnic multipoint release system for deployable telescope activated by shape memory alloy wires", Abstract only, Abstracts of the 55th International Astronautical Congress 2004, Vancouver, Canada. Oct. 4-8, 2004., 1 pg.

* cited by examiner

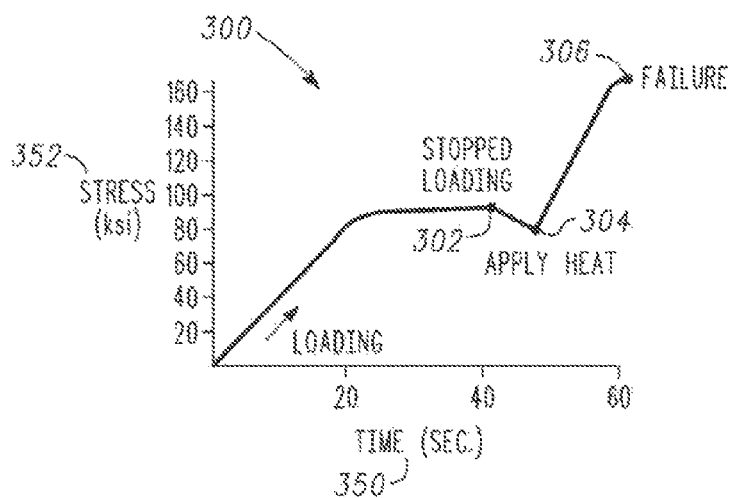
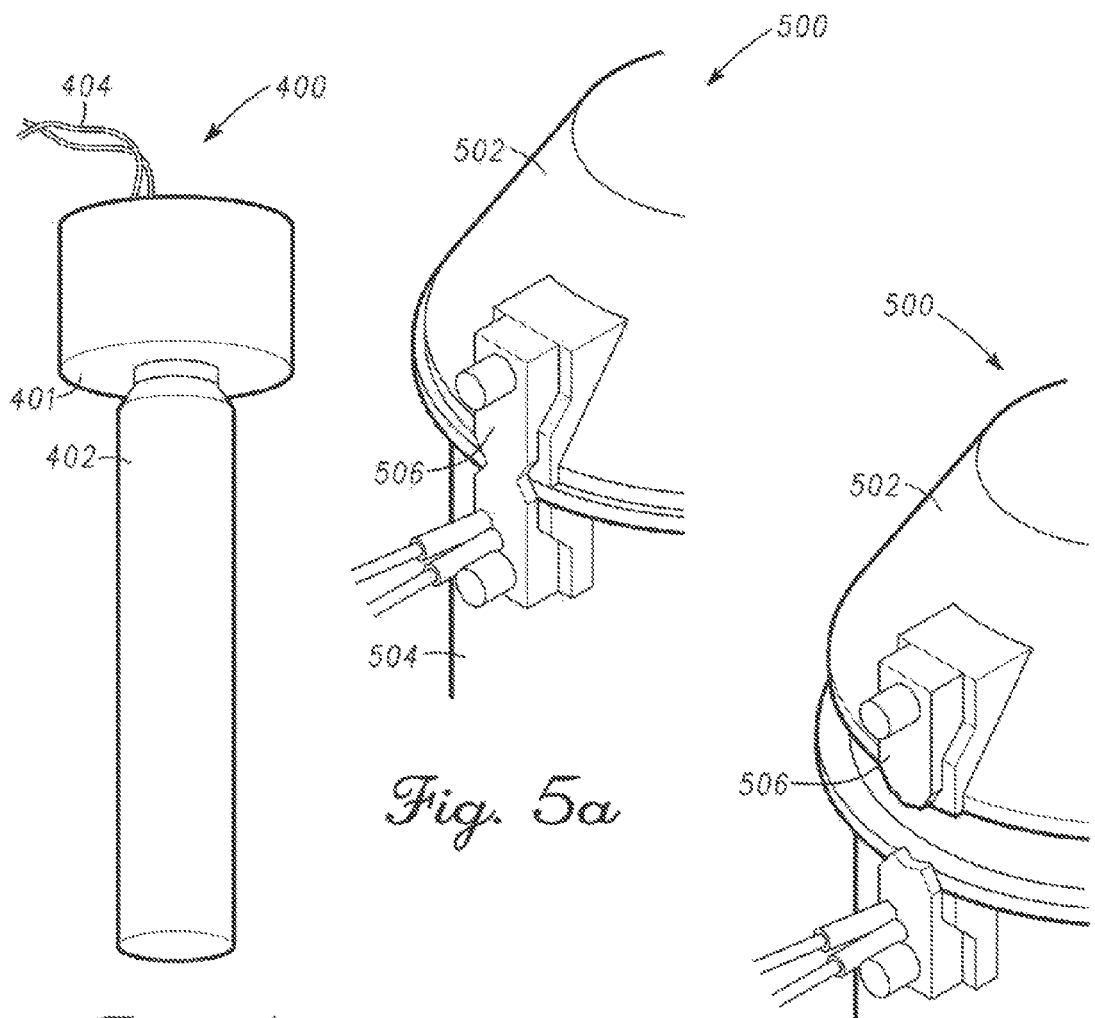

SHAPE MEMORY CIRCUIT BREAKERS

CROSS REFERENCE TO RELATED APPLICATION

This application is related to U.S. patent application Ser. No. 13/155,575, filed on Jun. 8, 2011, which is a continuation-in-part of commonly owned co-pending U.S. patent application Ser. No. 13/322,004, filed Dec. 10, 2008, and entitled, "Shape Memory Alloy Separating Apparatuses".

This application is related to U.S. patent application Ser. No. 13/155,592, filed on Jun. 8, 2011, which is a continuation-in-part of commonly owned co-pending U.S. patent application Ser. No. 13/322,004, filed Dec. 10, 2008, and entitled, "Shape Memory Alloy Separating Apparatuses".

This application is a continuation of U.S. patent application Ser. No. 13/155,581, filed on Jun. 8, 2011, which is a continuation-in-part of commonly owned co-pending U.S. patent application Ser. No. 13/332,004, filed Dec. 10, 2008, and entitled, "Shape Memory Alloy Separating Apparatuses", both of which are incorporated herein by reference in their entirety.

FIELD

The present disclosure relates generally to shape memory alloy apparatuses. In an embodiment, the disclosure relates to actuators, coupling apparatuses and sensors formed with a shape memory alloy.

BACKGROUND

A variety of apparatuses may be used for actuating objects or holding together objects that need to be later released. For example, an explosive bolt can be used to attach two or more objects and may later release the objects with an explosive force. An explosive bolt incorporates explosives that cause an explosion when initiated or triggered. The explosion breaks apart the explosive bolt to release the objects. The problem with explosive bolts is that they are dangerous to handle because of the explosives and the explosion may exert a large amount of shock load that may damage fragile machinery. In addition, shrapnel pieces or foreign object debris (FOD) resulting from the explosion can interfere with machinery or optics.

A variety of systems include electrically operated components configured to operate at a specified current or within a range of currents. Exposure of these systems to elevated currents may damage the components and require repair or replacement. Fuses are electrically coupled with these components and are triggered by elevated currents that melt the fuse material and open a circuit. Opening of the circuit interrupts the flow of electricity to the component, shutting it down, and preventing damage to the component.

Electrically operated components and the fuses associated with them are subject to current spikes over the life of the fuse. Fluctuations in current raise the temperature of the fuse material even where the fluctuation is not sufficient to melt the fuse. Over time current fluctuations (e.g., from poor power conditioning) cause the fuse material to sublimate and thereby the fuse material is gradually decreased. The fuse material, along with its width and thickness are specified at construction to ensure melting of the fuse material at a current overload threshold. The gradual sublimation of the fuse material correspondingly lowers the threshold for melting of the fuse and allows the fuse to melt at lower currents. In some cases the partially sublimated fuse melts during a fluctuation in current that is below the desired current overload threshold. The electrically operated component coupled with such a fuse may have its operation interrupted unnecessarily through melting of the fuse in error. Alternatively, fuses with thicker fuse materials may be used, but thicker fuse materials increase the current overload needed to melt the fuse and thereby risk exposing the electrically operated components to currents spikes without operation of the fuse.

Furthermore, fuses are used with sensitive electronic components in some instances (e.g., optical systems, radio systems, radar systems and the like). The fuse material at least partially vaporizes within the fuse body when subjected to a current overload. The vaporized metal of the fuse allows for continued arcing of electricity between the fuse contacts. The arcing of electricity creates undesirable radio frequency signals that negatively affect these sensitive components decreasing or interrupting their operation.

SUMMARY

In an embodiment, a separating apparatus is provided that comprises a pre-strained member formed from a shape memory alloy. This member is configured to separate upon application of heat and the separation is configured to actuate an object.

In another embodiment, an apparatus is provided that comprises a first object, a second object, and a separating apparatus that is configured to couple the first object to the second object. In this example, the separating apparatus is formed from a shape memory alloy and is configured to separate upon application of heat.

In yet another embodiment, a separating apparatus is provided that comprises a pre-strained member configured to couple a first object to a second object. The member is formed from a shape memory alloy and is configured to separate and release the first object from the second object upon application of heat.

In still yet another embodiment, a method is provided for actuating an object that is configured to be in contact with an actuator. The actuator has a pre-strained member formed from a shape memory alloy and is configured to be in contact with the actuator. In this method, heat is applied to the member and the application of heat is configured to cause the member to separate, where the separation is configured to actuate the object.

In a further embodiment, a system and method are provided for a shape memory circuit breaker that fractures when subject to a specified range of currents or voltages (e.g., for instance a specified overload current or voltage) that generate a corresponding specified range of temperatures (e.g., a specified transition temperature) in the shape memory substrate of the circuit breaker. The specified range of temperatures includes, for instance, a specified transition temperature of the shape memory substrate corresponding to a specified overload current or overload voltage. The shape memory substrate is tunable to ensure the substrate only operates at a specified combination of temperature (including a range temperatures) and corresponding current or voltage (or ranges of either or both). For instance, the material, stress, strain, thermal and mechanical conditioning of the material as well as its thickness and width are chosen to ensure the shape memory substrate reliably operates at a precise transition temperature corresponding to one or more of a specified overload current or specified overload voltage.

The shape memory circuit breaker does not sublimate. Instead, the shape memory substrate is constructed with a shape memory material having a transition temperature below the temperature required for sublimation. Even with the current and voltage fluctuations the temperature of the shape memory substrate does not approach a temperature sufficient to cause sublimation. The shape memory substrate is thereby maintained throughout the operational lifetime of the shape memory circuit breaker and the specified range of currents or voltages that cause fracture of the shape memory substrate is also accordingly maintained. Accurate and reliable interruption of electrical power to components and equipment assemblies including the circuit breaker is thereby provided over the entire lifetime of the shape memory substrate prior to fracture.

Further, as described herein the shape memory substrate fractures. Upon fracture the fractured ends of the shape memory substrate withdraw from the initial fracture location toward the opposed first and second substrate ends of the shape memory substrate. For instance, the shape memory substrate is strained 8 to 10 percent of the overall length of the shape memory substrate. Upon fracturing the fractured ends resume an unstrained configuration and withdraw from the fracture location thereby providing an open span substantially equivalent to the length added to the shape memory substrate when strained. The withdrawal of the fractured ends substantially prevents arcing between the first and second substrate ends and thereby prevents the generation of radio frequency interference that may interfere with or damage sensitive components. Moreover, because the shape memory substrate fractures instead of melting as with prior art fuses there is no plasma within the shape memory circuit breaker to facilitate arcing between the substrate ends.

BRIEF DESCRIPTION OF DRAWINGS

The present disclosure is illustrated by way of example and not limitation in the figures of the accompanying drawings, in which like references indicate similar elements and in which:

FIG. 3 illustrates a plot of the mechanical behavior of a shape memory alloy with the application of heat, in accordance with an embodiment of the invention;

FIG. 4 illustrates an example of a separating apparatus, in accordance with an embodiment of the invention;

FIGS. 5A and 5B illustrate another embodiment of a separating apparatus used in a telescope assembly;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

The embodiments described herein provide a variety of separating apparatuses formed from shape memory alloys. An embodiment of the apparatus is an actuator formed from a shape memory alloy. An "actuator," as used herein, refers to an apparatus, mechanism, or mechanical device that is configured to activate or put an object, which is configured to be in contact with the actuator, into motion by imparting directly or indirectly kinetic energy to the object. Another embodiment of the apparatus is a coupling apparatus formed from a shape memory alloy. A "coupling apparatus," as used herein, refers to a mechanical device or mechanism that is configured to couple or hold together two or more objects. A fastener is an example of a coupling apparatus, which, for example, includes bolts, hooks, snaps, screws, nails, pins, rings, pins, and other fasteners. The apparatuses or portions of the apparatuses are formed from a shape memory alloy that exhibits a shape memory effect where, as described in more detail below, the shape memory alloy can be deformed and then returned to its original shape when heated.

Figures 1A, 1B, 1C, 1D:
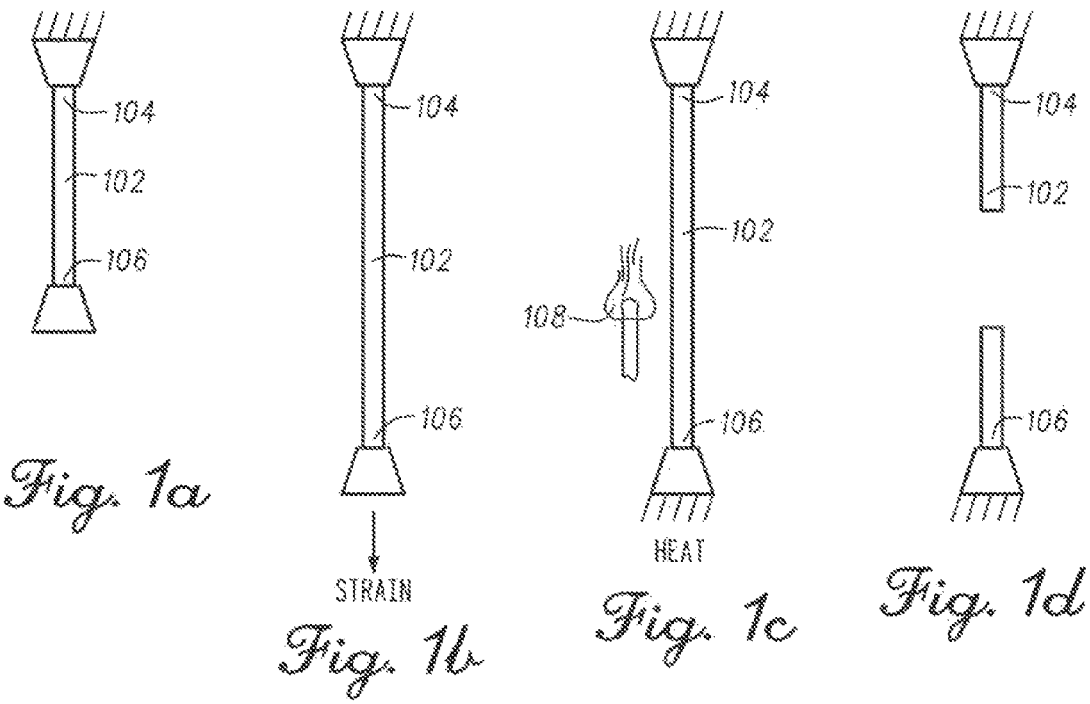
FIGS. 1A, 1B, 1C, and 1D illustrate the use of heat to separate a separating apparatus formed from a shape memory alloy, in accordance with an embodiment of the invention.

As illustrated in FIGS. 1a-1d, this shape memory effect may be used to separate a separating apparatus. FIG. 1a illustrates a member 102 of a separating apparatus formed from a shape memory alloy, in accordance with an embodiment of the invention. As used herein, a "member" refers to a constituent part of a separating apparatus and, in the example of FIG. 1a, the member 102 is in the shape of a bar having two opposing ends 104 and 106 that, as shown in FIG. 1b, are held in place and pulled in opposite directions such that the member 102 is under strain. As illustrated in FIG. 1c, the opposing ends 104 and 106 are fixed in place and a heating source 108 applies heat to the member 102, and upon application of heat, the member 102 separates into two pieces because of the shape memory effect. As used herein, to "separate" is to come apart caused by a break or fracture in the separating apparatus. As described in more detail below, such a unique property of shape memory alloys can be used as a release mechanism for a coupling apparatus or used to actuate an object.

Figure 2:
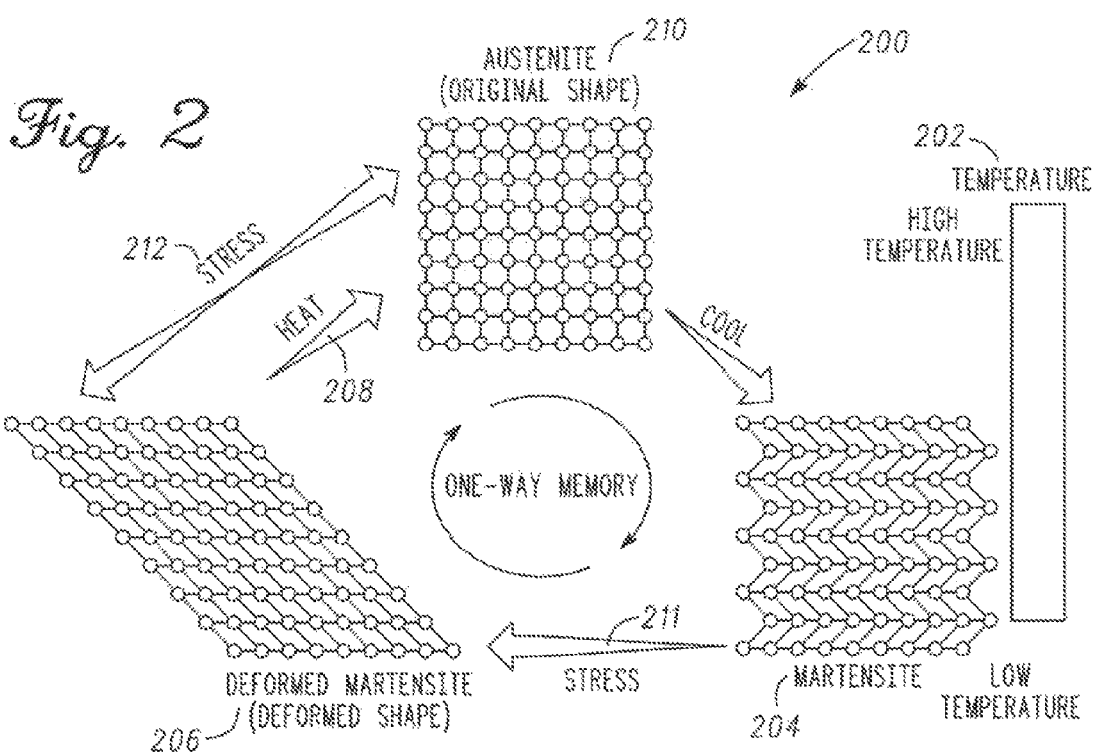
FIG. 2 is a diagram illustrating the various solid phases of a shape memory alloy at different temperatures and stress states.

FIG. 2 is a representative diagram 200 illustrating the various solid phases of a shape memory alloy at different temperatures and stress states. The diagram 200 includes a temperature reference 202 identifying a temperature increasing from a low temperature at the bottom of the diagram 200 to a high temperature at the top of the diagram 200. Additionally, the diagram 200 illustrates the different solid phases or crystal structures of a shape memory alloy at temperatures identified by the temperature reference 202.

It should be appreciated that shape memory alloys undergo a temperature related phase change that is characterized by the memory of a mechanical configuration imposed on the material at an annealing temperature. When the shape memory alloy is below some lower temperature, the alloy possesses a particular crystal structure whereby it may be deformed into an arbitrary shape with relative ease. Upon heating the alloy above a higher temperature, the alloy undergoes a change in crystal structure and the shape memory effect is manifested by a resumption of the originally imparted shape, representing the onset of a restoring stress.

FIG. 2 shows a pictorial diagram illustrating the shape memory effect of an example material formed from a shape memory alloy. At a low temperature (e.g., at room temperature), the shape memory alloy is in a martensite phase 204 where the shape memory alloy has a body centered tetragonal crystal structure and may be relatively soft and deformable. When stress 211 is applied to the martensite phase 204, the shape memory alloy is deformed and transformed into a deformed martensite phase 206. For example, the shape memory alloy in the martensite phase 204 may be stretched, compressed, and/or sheared such that it takes on a deformed shape that is in a deformed martensite phase 206. In the deformed martensite phase 206, the atoms may move past each other, but the bonds are not broken, and the atoms are still relatively placed to each other in the same position as the martensite phase 204.

Upon application of heat 208 to the shape memory alloy in the deformed martensite phase 206, which results in heating the shape memory alloy to a high temperature, the shape memory alloy inherently returns to its original shape. It should be noted that the imposition of stress 211 on the shape memory alloy in the martensite phase 204 is one way and causes the deformation of the material (e.g., into the deformed martensite phase 206) that will not go back to its unstressed or pre-stressed form until heat 208 is applied. On the other hand, stress 212 imparted in the austenite phase 210, which is explained in more detail below, is a bidirectional phase change in that when the stress 212 is removed, the shape memory alloy returns back to its unstressed form (e.g., deformed shape) without the addition of heat 208.

In the original shape, the shape memory alloy is in an austenite phase 210, which has a cubic crystal structure. When cooled to a low temperature, the shape memory alloy in the austenite phase 210 transitions back to the martensite phase 204. Unlike other metals, this transition between the phases (austenite phase 210 to martensite phases 204 and 206) is reversible and repeatable. It should be appreciated that a large amount of energy is stored in the deformed martensite phase 206, and this energy used by the shape memory alloy to return to its original shape can also be used to separate the shape memory alloy. Examples of shape memory alloys that exhibit the phases illustrated in FIG. 2 include nickel-titanium alloys (e.g., Nitinol), titanium-nickel alloys, copper-zinc-aluminum alloys, copper aluminum nickel alloys, nickel titanium hafnium alloys, and other shape memory alloys.

FIG. 3 illustrates a plot 300 of the mechanical behavior of a shape memory alloy with the application of heat, in accordance with an embodiment of the invention. The plot 300 is a stress versus time curve of a shape memory alloy where the horizontal axis 350 defines time and the vertical axis 352 defines the stress applied to a shape memory alloy.

As depicted in FIG. 3, the shape memory alloy is loaded or stressed (e.g., pulled, compressed, and/or sheared) for a duration of approximately 40 seconds at a constant strain rate at which point 302 the loading is stopped. Thereafter, at point 304, heat is applied to the shape memory alloy and as a result, the shape memory alloy is further stressed because it wants to return to its original shape. With sufficient stress (e.g., at approximately 160 ksi), the shape memory alloy separates or fails at point 306 of the plot 300.

FIG. 4 illustrates an example of a separating apparatus, in accordance with an embodiment of the invention. The separating apparatus may be in the form of a fracturing bolt 400, which is a type of coupling apparatus, that refers to a variety of fastening rods, pins, or screws that are configured to couple two or more objects together and also configured to separate (or fracture). The fracturing bolt 400 of FIG. 4 comprises a threaded cylindrical shaft member 402 with a head member 401 attached to the cylindrical shaft member 402. Here, both the head member 401 and the cylindrical shaft member 402 are formed from a shape memory alloy. Additionally attached to the fracturing bolt 400 are electrical wires 404 (or electrical leads).

The fracturing bolt 400 is pre-strained. A separating apparatus (e.g., the fracturing bolt 400) is pre-strained when it is preloaded to a predetermined strain value. That is, a separating apparatus is pre-strained when its body or structure is deformed as a result of an applied force. The fracturing bolt 400 is pre-strained such that when heat is applied to the member 402, the member 402 is configured to separate into two pieces. In an embodiment, the heat may be generated by resistance heating, which refers to a process in which heat is generated by passing an electric current through a conductor, such as the threaded cylindrical shaft member 402. In the example of FIG. 4, an electric current may be applied to the cylindrical shaft member 402 by way of the electrical wires 404 to generate heat in the cylindrical shaft member 402. In addition to resistance heating, a variety of other techniques to generate heat may be used, in accordance with other embodiments, which is explained in more detail below.

FIGS. 5a and 5b illustrate another embodiment of a separating apparatus used in a telescope assembly 500. As depicted in FIG. 5a, a telescope assembly 500 is comprised of objects, such as a cover 502 and a housing assembly 504, that are coupled together by a separating apparatus 506 in the form of a coupling apparatus. The separating apparatus 506 is a plate with two holes at both ends of the plate that fit into pegs of the cover 502 and the housing assembly 504, which, when fitted, prevents the cover 506 from being opened or detached from the housing assembly 504.

In this example, heat may be applied to the separating apparatus 506 by resistance heating where an electric current is applied to the separating apparatus 506. As depicted in FIG. 5b, the separating apparatus 506 separates into two pieces when heated and the separation thereby releases the cover 502 from the housing assembly 504 such that the cover 502 can be opened. In another embodiment, the separating apparatus 506, as explained in more detail below, can also be an actuator configured to actuate the cover 502 when separated.

Figure 6:
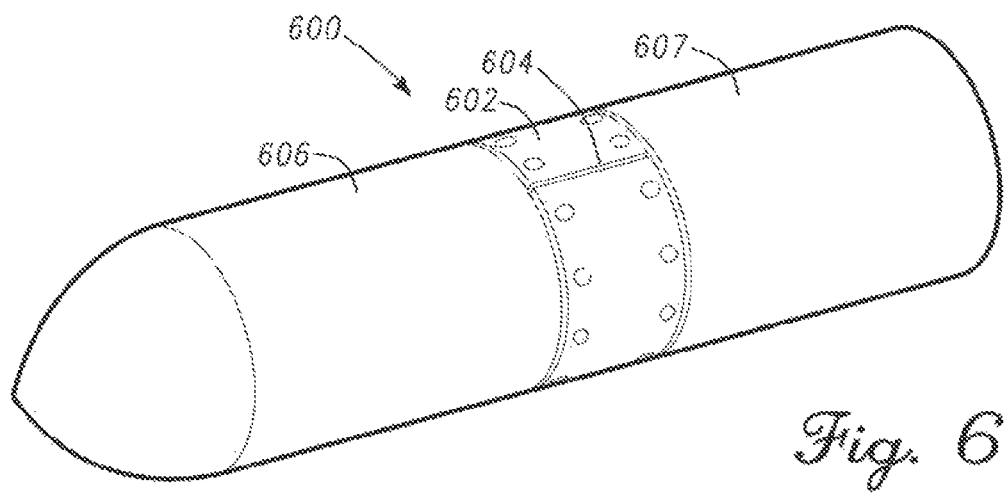
FIG. 6 illustrates yet another embodiment of a separating apparatus used in a multistage rocket.

FIG. 6 illustrates yet another embodiment of a separating apparatus 602 used in a rocket 600. The rocket 600 is a multistage rocket that comprises a first stage 606 mounted above a second stage 607 that are held together by a separating apparatus 602 in the form of a coupling apparatus. Each first stage 606 or second stage 607 contains its own engine and propellant. In effect, two rockets (first stage 606 and second stage 607) are stacked on top of each other. In this example, the separating apparatus 602 is a sleeve formed from a shape memory alloy and is configured to wrap around and couple the first stage 606 to the second stage 607.

Upon application of heat to the separating apparatus 602, the separating apparatus 602 separates to allow the first stage 606 to separate from the second stage 607. It should be noted that the location of the separation may be defined by machining a notch 604 into the separating apparatus 602 such that the separating apparatus 602 separates at the notch 604. The separating apparatus 602 illustrated in FIG. 6 may be used to replace traditional explosive mandrels with sheared rivets or traditional explosive bolts currently used to separate the first stage 606 from the second stage 607 of the rocket 600. The separating apparatus 602 has fewer parts when compared with traditional explosive mandrels and traditional explosive bolts, thereby resulting in a more reliable mechanism to allow the separation of the first stage 606 from the second stage 607.

Figure 7A:
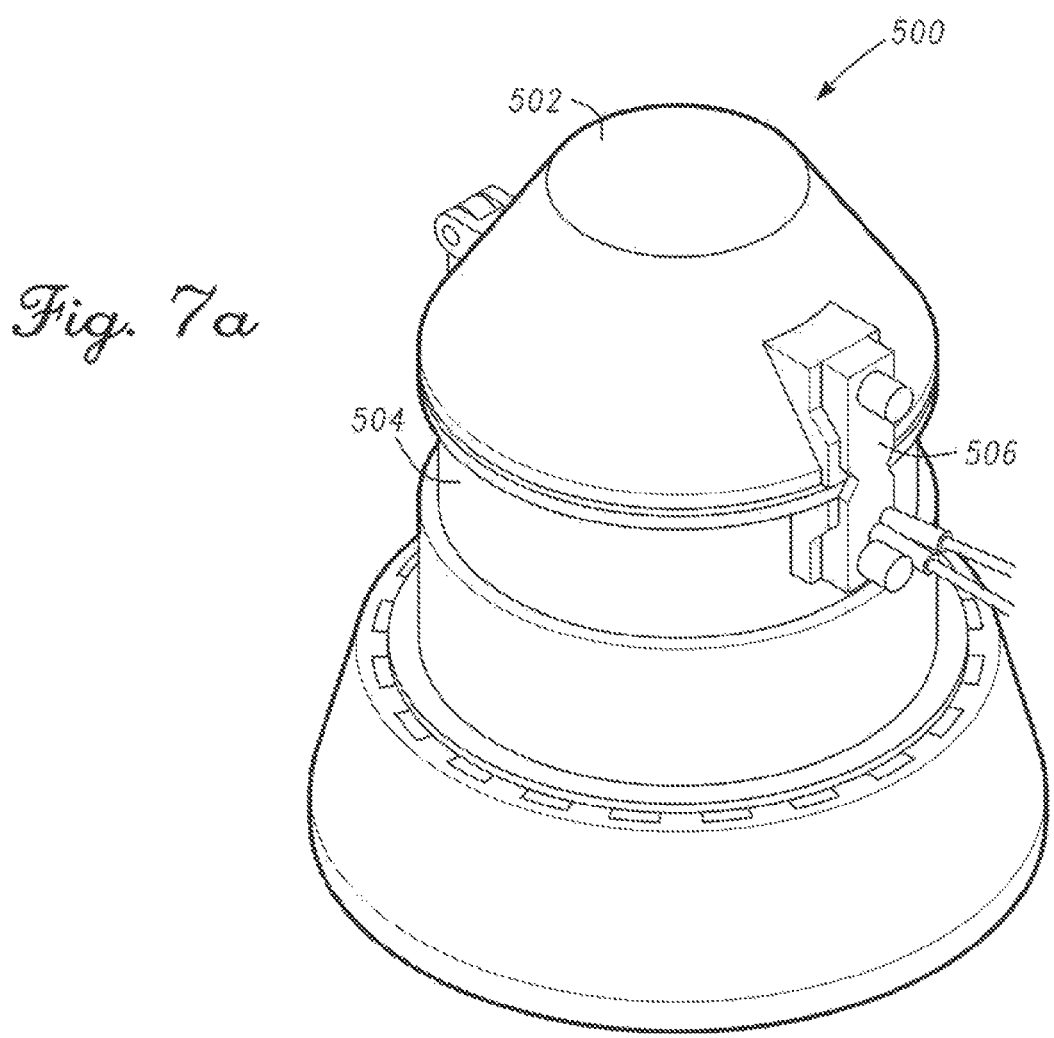
FIGS. 7A and 7B illustrate the use of a separating apparatus to actuate an object upon release, in accordance with an embodiment of the invention.
Figure 7B:
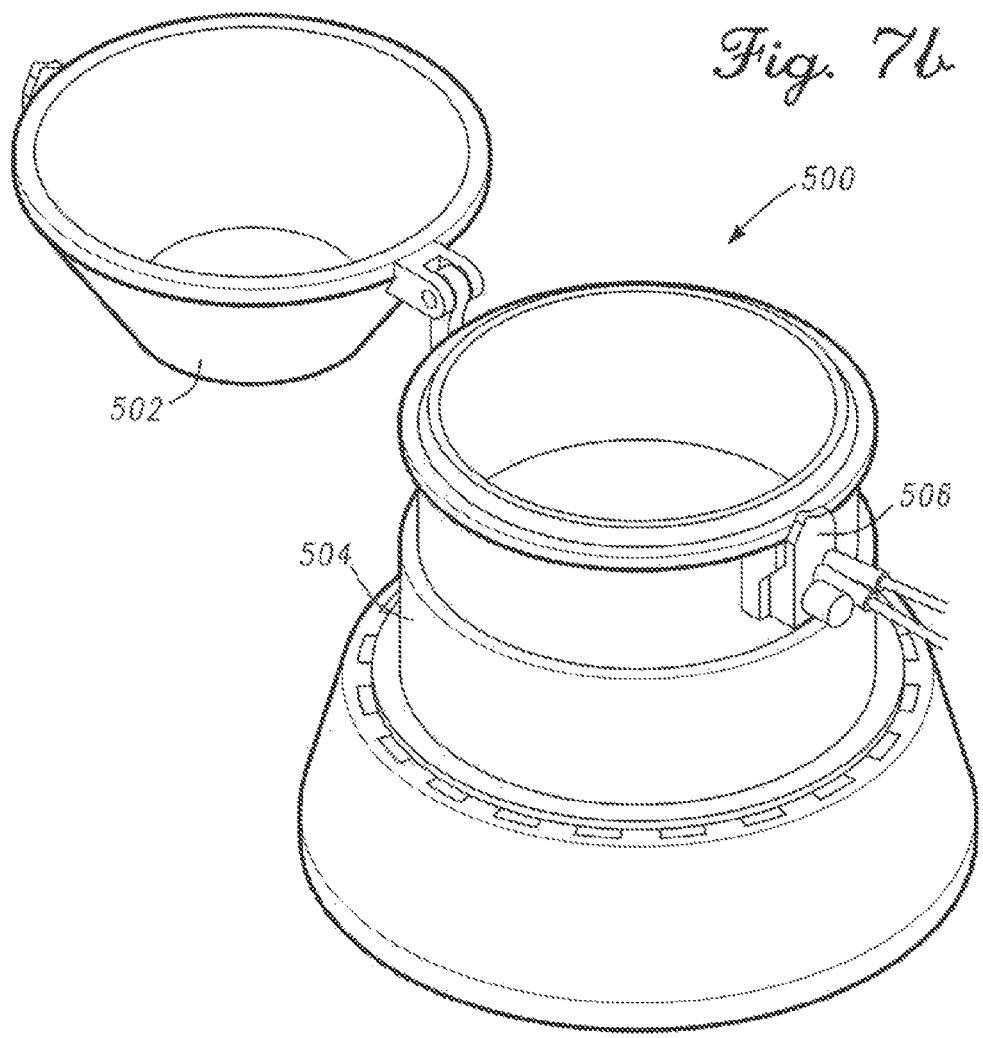

FIGS. 7a and 7b illustrate the use of a separating apparatus 506 to actuate an object upon release, in accordance with an embodiment of the invention. As illustrated in FIG. 7a and also discussed above, a telescope assembly 500 includes a cover 502 and a housing assembly 504 that are coupled together by a separating apparatus 506 formed from a shape memory alloy. In this embodiment, the separating apparatus 506 is in the form of an actuator that stores a large amount of mechanical energy that, when released, may be used to actuate an object.

For example, as illustrated in FIG. 7b, the separating apparatus 506 separates upon the application of heat, and this separation releases or imparts a large amount of kinetic energy to the cover 502 such that the energy snaps open the cover 502. As a result, in addition to releasing the cover 502 from the housing assembly 504, heat may, in effect, also be used to actuate or open the cover 502.

Figure 8:
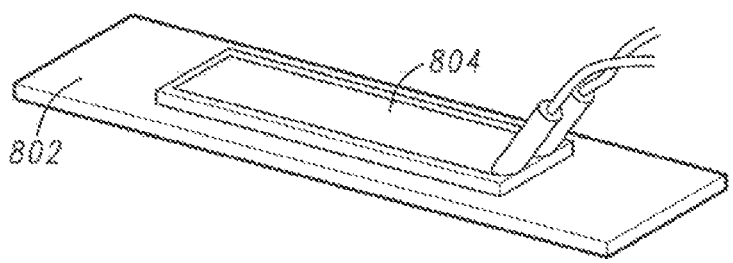
FIG. 8 illustrates an exothermic reactive foil according to an embodiment of the invention that may be used to generate heat.

FIG. 8 illustrates an exothermic reactive foil 804 according to an embodiment of the invention that may be used to generate heat. As discussed above, in addition to resistive heating, a variety of other heating techniques may be used to generate heat. For example, in an embodiment, a reactive foil 804 that may be used. In general, a reactive foil 804 is comprised of layers of metals or other materials (e.g., aluminum layers and/or nickel layers) that, when activated by an electric current, chemically react to deliver localized heat. An example of a reactive foil 804 is NANOFOIL®.

As illustrated in FIG. 8, the reactive foil 804 is attached to or deposited on a surface 802 of a separating apparatus 802 by way of, for example, a conductive adhesive. When an electric current is applied to the reactive foil 804, the electric current initiates a chemical reaction in the reactive foil 804 that results in an almost immediate, localized heating of the separating apparatus 802 that is used to separate the separating apparatus 802.

Figure 9:
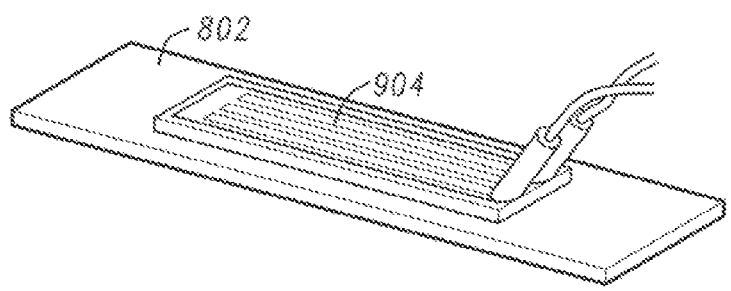
FIG. 9 illustrates resistance wires according to another embodiment of the invention that may also be used to generate heat.

FIG. 9 illustrates resistance wires 904 according to another embodiment of the invention that may also be used to generate heat. A resistance wire 904 is an electrical wire with a high electrical resistivity and is configured to generate heat upon application of an electric current. The resistance wire 904 may, for example, be formed from a nickel-chromium alloy.

As depicted in FIG. 9, resistance wires 904 are attached to a surface of the separating apparatus 802 using, for example, a conductive adhesive. When an electric current is applied to the resistance wires 904, the electric current causes the resistance wires 904 to generate heat, which is used to separate the separating apparatus 802.

Figure 10A:
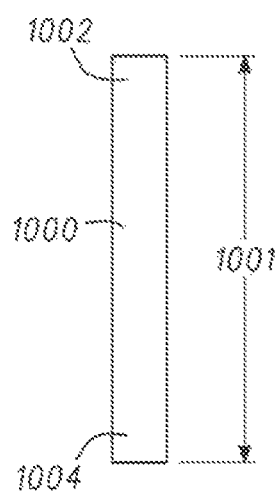
FIG. 10A illustrates one example of a shape memory substrate in an unstrained configuration.
Figure 10B:
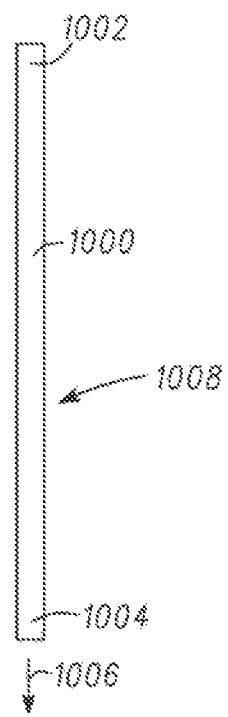
FIG. 10B illustrates the shape memory substrate of FIG. 10A in a strained electrically conductive configuration.

FIGS. 10A and 10B show one example of a shape memory substrate 1000 in an unstrained configuration (FIG. 10A) and a strained configuration 1008 (FIG. 10B). As shown in FIG. 10A, the shape memory substrate 1000 extends between first and second substrate ends 1002, 1004. One example of the shape memory substrate 1000 is constructed with a shape memory material including, but not limited to, Nitinol, copper-zinc-aluminum alloys, copper-aluminum-nickel alloys, nickel-titanium-hafnium alloys and other shape memory materials. Further, as previously described, in one example, the shape memory substrate 1000 is provided in an initial martensitic phase. The shape memory material is in the martensitic phase after transition from an austenitic phase. For instance, the material is cooled from the austenitic phase to the martensitic phase as previously described herein. Referring now to FIG. 10B, in the martensitic phase the shape memory substrate 1000 is exposed to one or more stresses 1006. As shown in FIG. 10B, the stress 1006 is provided along a longitudinal axis of the shape memory substrate 1000 (e.g., an axis coincident to the stress 1006). The applied stress 1006 transitions the shape memory substrate 1000 into the strained configuration 1008 wherein the shape memory substrate 1000 is deflected and has a longer length than that provided in FIG. 10A. The shape memory substrate 1000 is strained from around 1 to 10 percent relative to the unstrained length of the shape memory substrate 1000 shown in FIG. 10A.

As will be described in further detail below, the shape memory substrate 1000 described herein forms a shape memory circuit breaker that provides a reliable and accurate means for interrupting power to one or more components coupled with the shape memory substrate 1000 in a circuit. The shape memory substrate 1000 interrupts power where the substrate is exposed to a temperature at or above a specified range of transition temperatures that cause the substrate to transition from the strained conductive configuration to a fractured non-conductive configuration. As will be described in further detail below, the shape memory substrate 1000 is electrically coupled within a circuit. The specified range of transition temperatures correspond to a specified range of overload currents or voltages. When the shape memory substrate 1000 experiences an overload current or voltage at or above the specified range the corresponding resistive heating within the substrate meets or exceeds the specified range of transition temperatures and causes the shape memory substrate 1000 to transition to the fractured non-conductive configuration (shown and described below). Optionally, the specified range of overload currents or voltages correspond to a single overload current or voltage, and the specified range of transition temperatures thereby correspond to a single transition temperature.

The shape memory substrates 1000 described herein are readily tunable to change phases according to a desired transition temperature (or range of temperatures) corresponding to a desired overload current or voltage (or ranges of the same). For instance, the selection of shape memory materials, the thermal and mechanical conditioning of the materials, the thickness and width of the substrate 1000 and one or more of the stress and strain applied to the shape memory substrate 1000 cooperate to determine the transition temperature of the shape memory substrate 1000 (e.g., the temperature that the substrate will fracture when the first and second substrate ends 1002, 1004 are fixed in place). Tuning of the shape memory substrate 1000 to transition phases at a specified temperature or range of temperatures provides a reliable and accurate interruption of power where the specified temperature or range of temperatures correspond to specified overload currents or voltages. Stated another way, the shape memory substrate 1000 is chosen and constructed (e.g., by material selection, size of the substrate, conditioning and the like) to transition from the strained configuration to the fractured non-conductive configuration according to a specified overload current or voltage (or ranges of the same) that corresponds to a transition temperature (or range of temperatures) for the substrate.

Figure 10C:
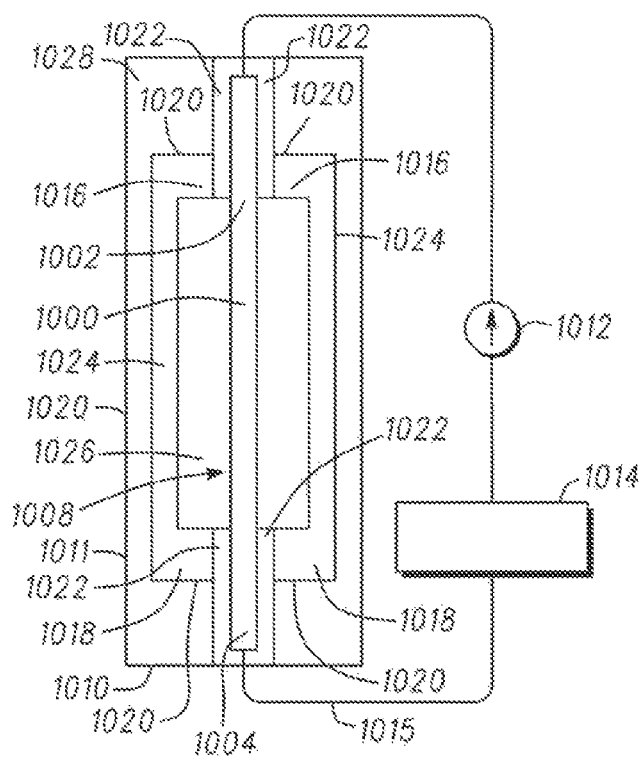
FIG. 10C illustrates a shape memory circuit breaker with the shape memory substrate of FIG. 10A in the strained electrically conductive configuration forming a complete circuit with an electrically operated component and an electric power source.

Referring now to FIG. 10C a shape memory circuit breaker 1010 including the shape memory substrate 1000 in the strained conductive configuration is shown. The shape memory circuit breaker 1010 is shown in a closed circuit 1015 including a power source 1012 (such as an electric power source) and an equipment assembly 1014. In one example, the equipment assembly 1014 includes, but is not limited to, any electrically driven component (or components) configured to operate with power from the power source 1012. The closed circuit 1015 thereby includes the power source 1012, the equipment assembly 1014 and the shape memory circuit breaker 1010 as well as the electrical connections extending between each of these components. As shown in FIG. 10C, the shape memory substrate 1000 is positioned within an isolation housing 1011. As shown, the isolation housing 1011 includes first and second opposed anchors 1016, 1018 engaged with the opposed first and second substrate ends 1002, 1004. In one example, the first and second anchors 1016, 1018 include jaws 1020 tightly engaging the first and second substrate ends 1002, 1004 and fixing the respective ends relative to one another (e.g., statically positioning the first and second ends 1002, 1004 relative to one another).

In another example, the first and second anchors 1016, 1018 include electrical insulation 1022 (e.g., contact pads) engaged with the shape memory substrate 1000. The electrical insulation 1022 substantially prevents shorting of electricity past the shape memory substrate 1000. In one example, the electrical insulation 1022 is incorporated within the first and second anchors 1016, 1018 and thereby provides an insulated gripping surface for engagement with the shape memory substrate 1000. Optionally, the electrical insulation 1022 includes pads interposed between the jaws 1020 and the substrate 1000. Where the electrical insulation 1022 includes pads, surfaces and the like the electrical insulation 1022 is optionally incorporated as part of the first and second anchors 1016, 1018.

The shape memory circuit breaker 1010 further includes the isolation housing 1011 that incorporates the first and second anchors 1016, 1018. The isolation housing 1011 isolates at least a portion of the shape memory substrate 1000 in the strained conductive configuration shown in FIG. 10C. The isolation housing 1011 further ensures the shape memory substrate 1000 is free to transition from the strained conductive configuration to the fractured nonconductive configuration shown in FIG. 10D without interference from engagement with other components of the shape memory circuit breaker 1010. For instance, the isolation housing 1011 includes an isolation cavity 1026. The shape memory substrate extends through the isolation cavity 1026 without impinging on other components of the circuit breaker 1010. When the substrate 1000 transitions from the strained conductive configuration shown in FIG. 10C to the fractured nonconductive configuration shown in FIG. 10D the substrate 1000 is free to make the transition engaging the other components in the shape memory circuit breaker 1010 that would otherwise engage with substrate and retard fracture during transition.

In another example, the isolation housing 1011 includes one or more braces 1024 extending between the first and second anchors 1016, 1018. The braces 1024 cooperate with the first and second anchors 1016, 1018 to statically position the first and second substrate ends 1016, 1018 relative to one another. Stated another way, the braces 1024 hold the first and second anchors 1016, 1018 at a set distance from each other and substantially prevent the shape memory substrate 1000 from reverting from the strained configuration shown in FIG. 10C to the unstrained configuration shown in FIG. 10A during transition. Instead, the braces 1024 cooperate with the first and second anchors 1016, 1018 to force the transition of the shape memory substrate 1000 to fracture the substrate and thereby break the circuit of the closed circuit 1015.

In the example shown in FIG. 10C, the isolation housing 1011 is shown as a monolithic structure extending around and coupled with the shape memory substrate 1000. In another example, the isolation housing 1011 is incorporated within an equipment assembly, for instance, within a motorized piece of equipment, a control panel, a computer server module and the like. When the isolation housing 1011 is incorporated into one or more of these devices the first and second anchors 1016, 1018 include, but are not limited to, structural contacts on the equipment assembly, for instance, projections, cantilevered ridges, housing portions and the like. The first and second anchors 1016, 1018 when incorporated within such an equipment assembly engage the shape memory substrate 1000 at the first and second substrate ends 1002, 1004 in a substantially similar manner to the isolation housing 1011 shown in FIG. 10C (e.g., a standalone isolation housing separate from the equipment assembly 1014). In an example where the isolation housing 1011 is incorporated into an equipment assembly the braces 1024 are similarly incorporated into the equipment assembly, for instance, into a housing of the equipment assembly. Stated another way, where the shape memory circuit breaker 1010 is incorporated into an equipment assembly without a dedicated isolation housing 1011 the shape memory substrate 1000 including the first and second substrate ends 1002, 1004 is anchored at the first and second substrate ends with portions of the equipment assembly. The first and second substrate ends 1002, 1004 are thereafter indirectly braced, for instance, with portions of the equipment assembly such as a mechanical housing, a server housing, a control panel housing, and the like.

Referring again to FIG. 10C, in one example, the shape memory circuit breaker 1010 (e.g., the isolation housing 1011) includes a thermal insulator 1028 extending around at least a portion of the shape memory substrate 1000. The thermal insulator 1028 substantially isolates the shape memory substrate 1000 from environmental temperatures exterior to the shape memory circuit breaker 1010. The inclusion of a thermal insulator 1028 substantially prevents the operation of the shape memory substrate 1000 according to environmental temperatures exterior to the shape memory circuit breaker 1010. Stated another way, the thermal insulator 1028 ensures that the shape memory substrate remains in the strained conductive configuration until an overload current or voltage is delivered through the shape memory substrate that correspondingly heats the shape memory substrate 1000 through resistive heating therein. The thermal insulator 1028 thereby substantially prevents the heating of the shape memory substrate 1000, for instance, by elevated environmental temperatures that would otherwise cause the shape memory substrate 1000 to fracture as shown in the fractured configuration in FIG. 10D.

As will be described in further detail below, in another example the shape memory circuit breaker 1010 does not include a thermal insulator 1028. Instead, the shape memory circuit breaker 1010 is configured to provide dual functions. For instance, the shape memory circuit breaker 1010 is configured to fracture at an elevated environmental temperature. In such an example, the shape memory circuit breaker 1010 comprises a thermal electric circuit breaker configured to interrupt and open the closed circuit 1015 according to elevated environmental temperatures at or above the transition temperature 1000 as well as overload currents and voltages that generate heat within the shape memory substrate 1000 and elevate the temperature of the shape memory substrate above the transition temperature of the substrate.

Figure 10D:
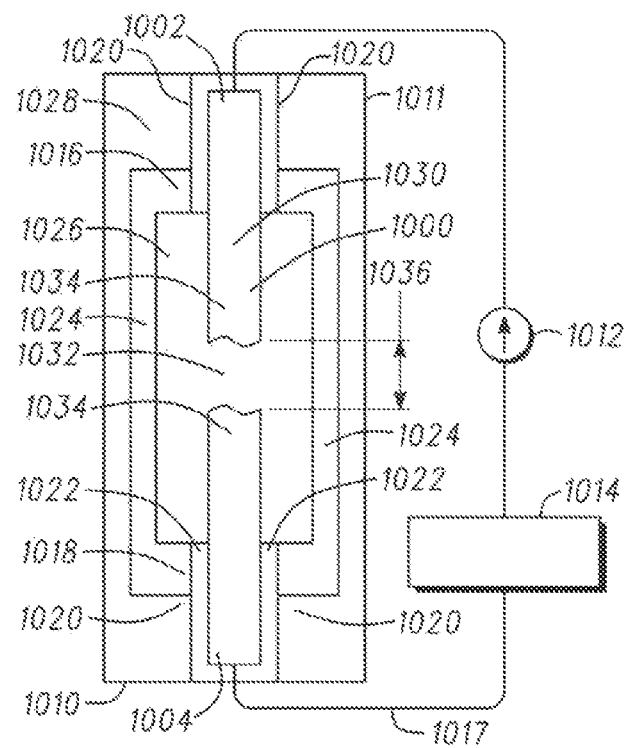
FIG. 10D illustrates the shape memory circuit breaker with the shape memory substrate in a fractured non-conductive configuration and forming an open circuit.

FIG. 10D shows the shape memory circuit breaker 1010 in a fractured nonconductive configuration. The shape memory substrate 1000 is shown in the fractured nonconductive configuration 1030 with a fracture 1032 extending between the first and second substrate ends 1002, 1004. The fractured non-conductive configuration of the shape memory substrate 1000 shown in FIG. 10D opens the circuit (open circuit 1017) and interrupts the delivery of power to the equipment assembly 1014. As previously described, when the shape memory substrate 1000 is exposed to a specified temperature (or range of temperatures) the shape memory substrate 1000 is tuned to transition from the strained conductive configuration shown, for instance, in FIGS. 10B and 10C to the fractured nonconductive configuration shown in FIG. 10D. The shape memory substrate 1000 transitions to the fractured nonconductive configuration 1003 because of the anchoring of the first and second substrate ends 1002, 1004 by the isolation housing 1011. That is to say, when the shape memory substrate 1000 is exposed to the specified temperature corresponding to an overload current or voltage (or ranges of the same) the substrate 1000 attempts to transition from the strained configuration 1008 to the initial configuration shown in FIG. 10A. Because of the anchoring of the first and second substrate ends 1002, 1004 the shape memory substrate 1000 instead fractures as shown by the fracture 1032 thereby breaking the closed circuit 1015 shown in FIG. 10C and forming the open circuit 1017 as shown in FIG. 10D.

As previously described herein, the shape memory substrate 1000 is configured to operate at a range of temperatures (e.g., including but not limited 100 to 102° C. or higher or lower ranges in temperatures). In another option, operation at a range of temperatures includes operation at a single temperature such as 100° C. The specified ranges of temperatures correspond to specified overload currents and overload voltages and ranges for the same. For instance, in one example, the specified range of overload voltages includes the range of 130 to 140 volts. The shape memory substrate 1000 is configured to resistively heat to a corresponding range of specified transition temperatures when subject to the overload range of voltages (e.g., 130 volts to 140 volts). Resistive heating of the shape memory substrate 1000 in the strained configuration 1008 shown in FIG. 10C, elevates the temperature of the shape memory substrate 1000 to the specified range of transition temperatures. Stated another way, operation of the shape memory circuit breaker 1010 at or above the range of overload currents or voltages resistively heats the shape memory substrate 1000 and triggers transition of the shape memory substrate 1000 into the fractured nonconductive configuration 1030 shown in FIG. 10D. In yet another example, the shape memory substrate 1000 is configured to transition to the fractured nonconductive configuration 1030 according to a specified range of overload currents, for instance, a range of currents including 10 to 15 amps. When the shape memory substrate is in the configuration shown in FIG. 10C (the strained conductive configuration) is subject to an overload current within the specified range or greater the shape memory substrate 1000 resistively heats to the corresponding specified range of transition temperatures for the substrate material and the substrate transitions to the fractured nonconductive configuration 1030 shown in FIG. 10D thereby breaking the closed circuit 1015 and interrupting the delivery of power to the equipment assembly 1014. Stated another way, the shape memory substrate 1000 of the shape memory circuit breaker 1010 is tuned, for instance, with material selection, thickness, width, mechanical and thermal conditioning and the like to have a transition temperature or range of specified transition temperatures to correspond to one more of overload current ranges or overload voltage ranges and fracture at those temperature and voltage or current combinations and interrupt power to electrically operated components, for instance, the equipment assembly 1014.

In another example, the shape memory substrate 1000 includes a transition temperature or range of transition temperatures substantially below the sublimation temperature for the substrate material. Because the shape memory substrate 1000 includes transition temperatures below the shape memory sublimation temperature the shape memory substrate 1000 is substantially prevented from sublimating over the lifetime of the shape memory circuit breaker 1010 operation in contrast to electrical fuses that rely on melting of a substrate material that is capable of sublimating according to voltage and current spikes. The thickness and width of the shape memory substrate 1000 is maintained over the operational lifetime of the shape memory circuit breaker 1010 and the shape memory circuit breaker 1010 thereby reliably operates to interrupt power of the closed circuit 1015 according to the specified overload current ranges and overload voltage ranges. The shape memory circuit breaker 1010 allows for the continued operation of the equipment assembly 1014 and only interrupts the flow of power to the equipment assembly 1014 where one or more of the current or voltage within the closed circuit 1015 rises to or above the specified range of overload voltages or currents. In contrast, fuses have a meltable substrates that sublimate over time and may unnecessarily interrupt the flow of power to the equipment assembly 1014 as the fuse elements correspondingly melt at lower voltages and currents than the specified overload voltages or currents because of narrowed substrates.

Figure 11:
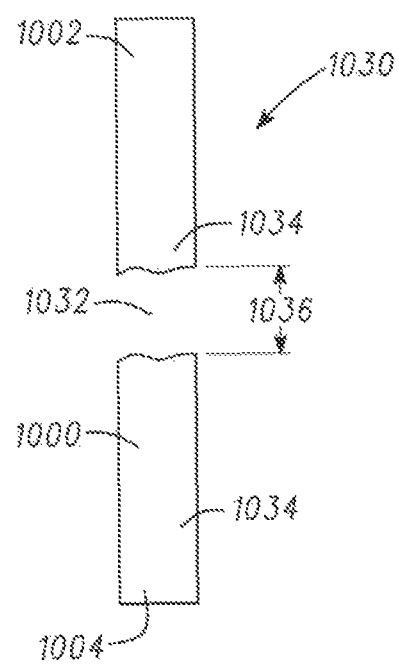
FIG. 11 illustrates the shape memory substrate of FIG. 10D in detail including the fracture location and the fracture length.

Referring now to FIG. 11, a detailed view of the shape memory substrate 1000 in the fractured nonconductive configuration 1030 shown in FIG. 10D is provided. As shown the shape memory substrate 1000 is fractured at the fracture 1032 thereby separating the first and second substrate ends 1002, 1004. In one example, where the shape memory substrate 1000 is strained into the configuration shown in FIG. 10B the shape memory substrate 1000 thereafter attempts to revert to the unstrained configuration shown in FIG. 10A when heated to the transition temperature. Stated another way, the shape memory substrate 1000 attempts to return to the unstrained configuration.

A detailed view of the fracture 1032 shown FIG. 10D is provided in FIG. 11. Referring to FIG. 11, the shape memory substrate 1000 is shown in the fractured configuration with opposed fractured ends 1034 separated at the fracture 1032. As previously described, the shape memory substrate 1000 fractures when exposed to a specified temperature or range of temperatures, for instance, temperatures generated when one or more of overload currents or voltages are applied across the shape memory substrate 1000 of the shape memory circuit breaker 1010 shown in FIGS. 10C and 10D. As shown in FIG. 11, the fracture 1032 has a fracture length 1036 between the opposed fractured ends 1034 of the first and second substrate ends 1002, 1004. In one example, the fracture length 1036 corresponds to the amount of strain applied to the shape memory substrate 1000, for instance the strain 1006 that changes the shape memory substrate from the unstrained configuration shown in FIG. 10A to the strained configuration 1008 shown in 10B.

In one example, where the shape memory substrate 1000 is strained from 1 to 10% relative to the original length 1001 of the shape memory substrate 1000 the corresponding fracture length 1036 of the fracture 1032 corresponds to the amount of strain applied to the shape memory substrate 1000. That is to say, the transition of the shape memory substrate 1000 from the strained configuration shown in FIG. 10C to the fractured nonconductive configuration shown in FIG. 10D provides a fracture 1032 having a fracture length 1036 corresponding to the amount of strain applied to the shape memory substrate 1000. For instance, where the shape memory substrate 1000 is strained 8% relative to the original substrate length 1001 (shown in FIG. 10A) the fracture length 1036 corresponds to 8% of the original fracture length 1001. That is to say, by providing a relatively large amount of strain to the shape memory substrate 1000 the fracture length 1036 of the fracture 1032 caused by the transition of the shape memory substrate 1000 to the fractured nonconductive configuration 1030 is reliably large. By providing a large fracture length 1036 arcing and the like across the fractured ends 1034 of the first and second substrate ends 1002, 1004 is substantially prevented.

Additionally, as previously described herein the shape memory substrate 1000 fractures as shown in FIG. 10D and does not melt as is the case with previous fuses. Because the shape memory substrate 1000 fractures free particles, for instance within the isolation housing 1011, are substantially prevented. The generation of plasma, for instance, with electricity arcing between the first and second substrate ends 1002, 1004 and interacting with particles of a melting substrate is thereby substantially prevented. Instead, because the shape memory substrate 1000 fractures melted particles are not included within the shape memory circuit breaker 1010 thereby substantially preventing the generation of plasma and the corresponding arcing across plasma within the shape memory circuit breaker 1010. The shape memory circuit breaker 1010 thereby provides a reliable and accurate system for interrupting power to the equipment assembly 1014 through fracture of the shape memory substrate 1000 at a specified temperature or range of temperatures corresponding to one or more of specified overload current or overload voltage overload within the closed circuit 1015.

In one example, the shape memory substrate 1000 includes a fracture locus positioned between the first and second substrate ends 1002, 1004 as well as the first and second anchors 1016, 1018. In one example, the fracture locus includes a decrease in cross sectional area of the shape memory substrate 1000 somewhere between the first and second anchors 1016, 1018. For instance, the fracture locus includes a notch formed in the shape memory substrate 1000, for instance by cutting, molding, coining and the like. In another example, the fracture locus includes a weakened portion of the substrate 1000 between the first and second anchors 1016, 1018. For instance, the fracture locus includes a fatigued portion of the substrate 1000. The inclusion of a fracture locus between the first and second anchors 1016, 1018 ensures the shape memory substrate 1000 fractures between the first and second substrate ends 1002, 1004 and does not partially or fully fracture at the anchors. Instead, the substrate 1000 reliably and fully fractures at the fracture locus between the first and second anchors 1016, 1018 thereby consistently breaking the circuit.

Figure 12:
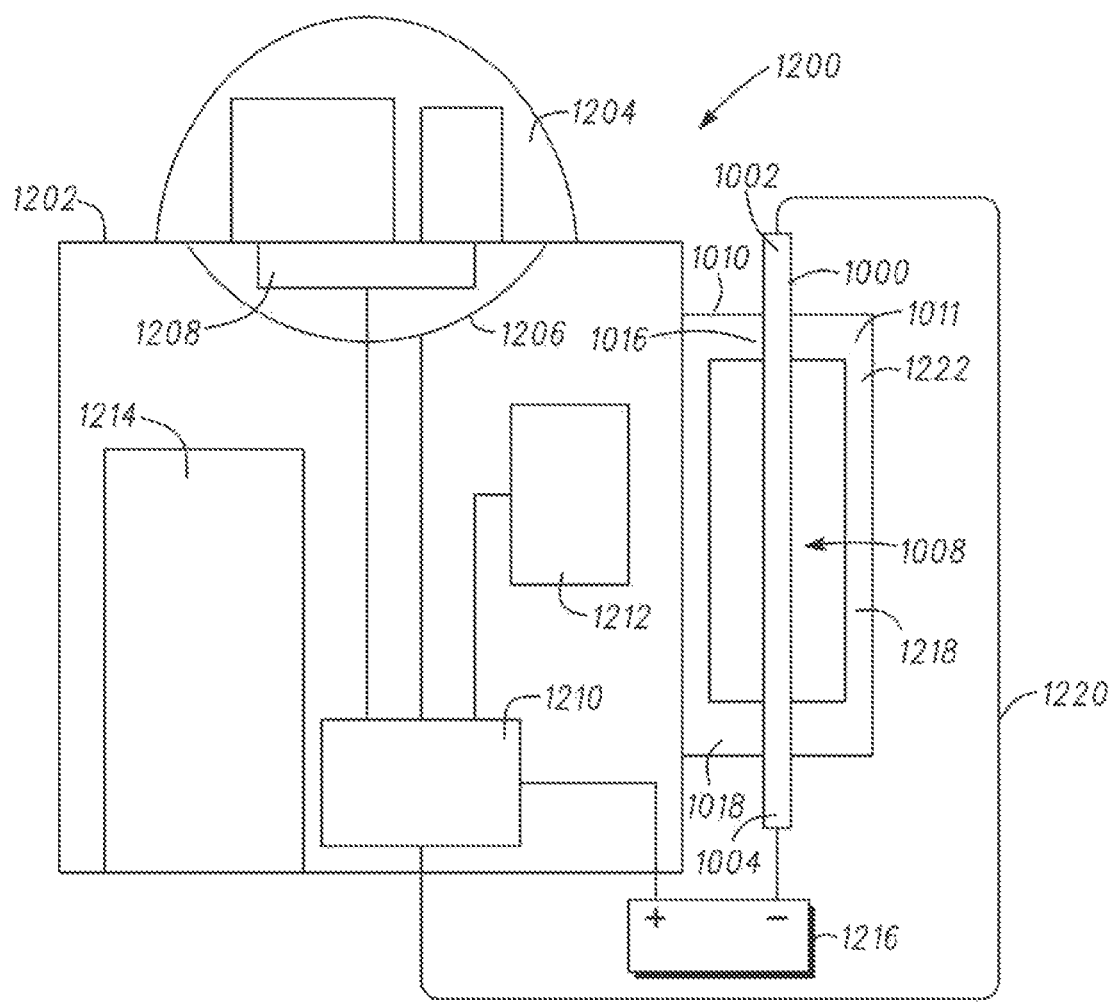
FIG. 12 illustrates a combination thermo-electro circuit breaker coupled with an equipment assembly.

FIG. 12 shows one example of an equipment assembly including an optical assembly 1200 including sensitive mechanical and electronic components that are electrically driven (e.g., electrically driven components). As shown in FIG. 12, the optical assembly 1200 includes an optical housing 1202 having an optics module 1204 provided thereon. In one example, the optics module 1204 includes one or more instruments configured to sense and detect various visible phenomena. As further shown in FIG. 12, the optical assembly 1200 includes an actuator 1206 configured to actuate the optics module 1204 into whatever orientation is necessary for operation of the module. Additionally, the optical assembly 1200 further includes a sensor 1208 coupled with the optics module 1204 to assess and interpret data received from the instruments within the optics module 1204. In yet another example, the optical assembly 1200 includes a processor 1210 in communication with one or more of the sensor 1208 and the actuator 1206. The processor 1210 includes, but is not limited to, a CPU, circuit board, semiconductor, a plurality of semiconductors and the like configured to control the operation of the optical assembly 1200, cooperate with a storage module 1212, and relay information from the optical assembly 1200 to other systems, for instance, systems within aircraft, rockets, missiles, vehicles and the like.

In one example, the optical assembly 1200 includes a thermo-electric cooler 1214 sized and shaped to cool the optical assembly 1200 during operation. In one example, the optical assembly 1200 operates at an elevated temperature and operation of the thermo-electric cooler 1214 is required to cool the components of the optical assembly and ensure the components do not overheat, become damaged and thereby become inoperable or partially inoperable. Additionally, voltage and current overloads may also damage the sensitive electrically driven components of the optical assembly 1200. In some examples, damaging components within the optical assembly 1200 ruins the entire optical assembly 1200 and requires expensive repair and/or replacement of the optical assembly or components of the optical assembly.

Referring again to FIG. 12, a thermo-electro circuit breaker 1218 is shown coupled to the optical assembly 1200. In one example, the thermo-electro circuit breaker 1218 is positioned adjacent to the optical housing 1202 (e.g., on the exterior or interior of the optical housing 1202). In at least some regards the thermo-electro circuit breaker is similar to the shape memory circuit breaker 1010 previously described herein. For instance, the thermo-electro circuit breaker 1218 includes a shape memory substrate 1000 having first and second opposed substrate ends 1002, 1004 coupled between first and second anchors 1016, 1018 of an isolation housing 1222. As previously described, the shape memory substrate 1000 is in an initial conductive strained configuration within the isolation housing 1222. As shown in FIG. 12, the shape memory substrate 1000 is in a closed circuit 1220 in the strained conductive configuration with a power source 1216 and the optical assembly 1200 (e.g., the controller 1210).

The shape memory substrate 1000 is configured to transition to a fractured non-conductive configuration, such as the configuration shown in FIG. 10D, when the shape memory substrate 1000 is exposed to a transition temperature (or range of temperatures) that cause the shape memory substrate to transition from the strained configuration shown in FIG. 12 to the fractured configuration. The thermo-electro circuit breaker 1218 does not include the thermo insulator 1028 shown in FIGS. 10C and 10D. Instead, the shape memory substrate 1000 is configured to transition from the strained conductive configuration to the fractured non-conductive configuration according spikes in temperature in the optical assembly 1200 as well as the incidence of overload currents and voltages (e.g., or ranges of the same). Optionally, the thermo-electro circuit breaker 1218 is only configured to transition from the strained conductive configuration to the fractured non-conductive configuration where the temperature of the equipment assembly (e.g., the optical assembly 1200) is at or above a specified operation temperature threshold and the shape memory substrate temperature is thereby correspondingly elevated to or above the transition temperature.

As previously described, the optical assembly 1200 includes sensitive electrically operated components including, for instance, an optics module 1204, an actuator 1206, a sensor 1208, and the like. Spikes in temperature within the optical assembly 1200 may damage the sensitive components. Similarly, overload currents and voltages within the optical assembly 1200 may also damage the sensitive components of the optical assembly. The thermo-electro circuit breaker 1218 is configured to transition from the strained conductive configuration to the fractured non-conductive configuration and thereby interrupt the flow of power to the optical assembly 1200 when exposed to one or more of overload currents or voltages and temperature spikes above a specified transition temperature.

In the case where the optical assembly 1200 is exposed to an overload current or voltage, the shape memory substrate 1000 is resistively heated by the overload current or voltage. Resistive heating of the shape memory substrate 1000 at overload currents or voltages raises the temperature of the shape memory substrate 1000 to a corresponding transition temperature of the shape memory material. The shape memory substrate 1000 attempts to return to the unstrained configuration shown in FIG. 10A. Because the shape memory substrate 1000 is anchored at the first and second substrate ends 1002, 1004 the shape memory substrate 1000 fractures as shown in FIG. 10D. Fracture of the shape memory substrate 1000 interrupts the flow of electricity to the optical assembly thereby shutting the optical assembly down before damage to the sensitive components of the optical assembly 1200 occurs.

Additionally (or alternatively), the thermo-electro circuit breaker 1218 is configured to transition and fracture when exposed to temperature spikes at the optical assembly 1200 at or above the specified transition temperature for the shape memory substrate 1000. For instance, the shape memory substrate 1000 is configured (e.g., through thermal mechanical conditioning material selection and the like) to transition from the strained conductive configuration shown in FIG. 10C to the fractured non-conductive configuration shown in FIG. 10D. In one example, the thermo-electro circuit breaker 1218 is positioned in close proximity to the optical assembly 1200, for instance, on the exterior of the optical housing 1202 or interior to the optical housing to ensure the thermo-electro circuit breaker 1218 is adjacent to near any temperature spikes therein. Fracture of the shape memory substrate 1000 according to temperature spikes within the optical assembly 1200 above a specified operation temperature threshold interrupts the flow of power to the optical assembly 1200, for instance during failure of the thermo-electric cooler 1214 shown in FIG. 12. Interruption of power to the optical assembly 1200 thereby shuts down the optical assembly 1200 and substantially prevents the damage of the sensitive components within the optical assembly because of overheating.

The thermo-electro circuit breaker 1218 thereby provides a consolidated system configured to interrupt power to the optical assembly 1200 according to temperature spikes within the optical assembly 1200, as well as overload currents or voltages delivered through the closed circuit 1220. The thermo-electro circuit breaker 1218 provides a consolidated device that substantially protects the optical assembly 1200 against thermal and electrical events that could otherwise damage the optical assembly 1200. In another example, the thermo-electro circuit breaker 1218 includes two or more circuit breakers 1218. In one example, a first thermo-electro circuit breaker 1218 is configured to fracture according to specified overload currents or voltages (or ranges of the same). Optionally, the first thermo-electro circuit breaker 1218 is thermally insulated as with the circuit breaker 1010 described previously. A second thermo-electro circuit breaker 1218 is positioned in series with the first thermo-electro circuit breaker 1218. The second thermo-electro circuit breaker 1218 is configured to fracture according to temperature spikes within the optical assembly 1200. Stated another way, multiple thermo-electro circuit breakers 1218 are provided with varying specified temperatures or ranges of temperatures to selectively fracture according to a detected thermal or electrical event, such as a failure of the thermo electric cooler 1214 or a voltage or current spike within the optical assembly 1200.

Figure 13:
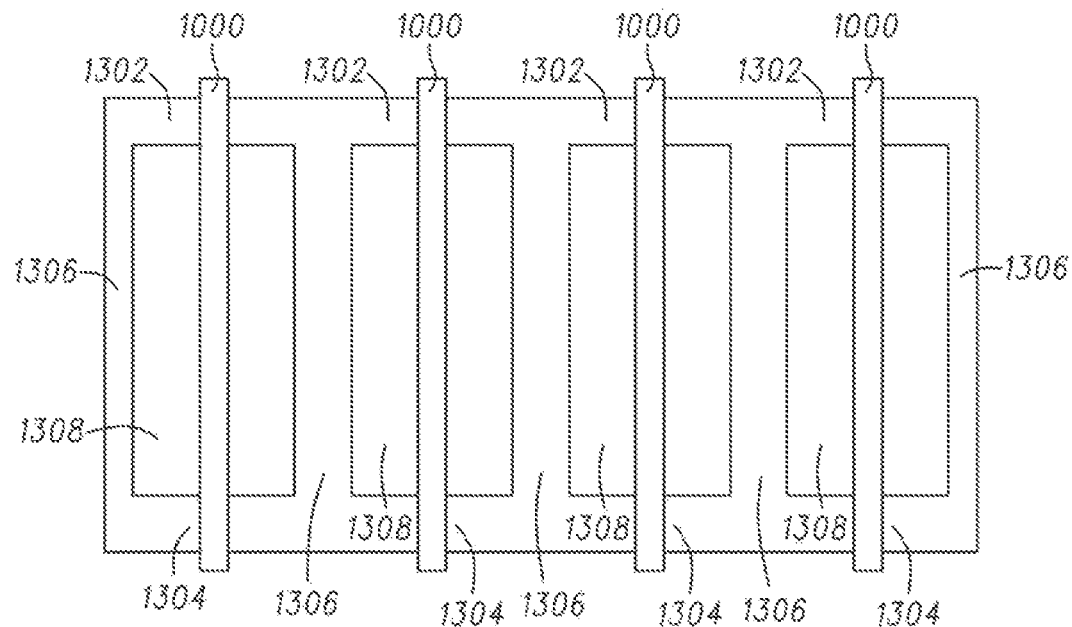
FIG. 13 illustrates a breaker housing including a plurality of shape memory circuit breakers therein.

FIG. 13 shows one example of a breaker housing 1300 including a plurality of shape memory circuit breakers incorporating shape memory substrates 1000. As shown in FIG. 13, the shape memory circuit breakers such as the circuit breakers 1010 shown in FIGS. 10C and 10D are incorporated into the structure of the breaker housing 1300. For instance, the breaker housing 1300 includes a plurality of first anchors 1302 and a plurality of second anchors 1304. The first and second anchors 1302, 1304 are coupled with opposed ends of the shape memory substrate 1000 and anchor the shape memory substrate within the breaker housing 1300. As previously described, by anchoring the shape memory substrates 1000 one or more of overload currents or voltages applied across the shape memory substrate 1000 cause the shape memory substrates 1000 to fracture as shown in FIG. 10D thereby opening corresponding circuits and interrupting the flow of power to one or more electrically operated components or equipment assemblies.

Referring again to FIG. 13, the breaker housing 1300 further includes one or more braces 1306 extending between the plurality of first and second anchors 1302, 1304. The braces 1306 cooperate with the first and second anchors 1302, 1304 to statically position the shape memory substrates 1000 within the breaker housing 1300. Additionally, the braces 1306 space the breaker housing 1300 from the portions of the shape memory substrates 1000 extending between the first and second anchors 1302, 1304. Stated another way, the breaker housing 1300, including the braces 1306, includes isolation cavities 1308 that retain the shape memory substrates 1000 therein. The isolation cavities 1308 space the breaker housing 1300 from the shape memory substrates 1000 and thereby allow the shape memory substrates 1000 to easily transition from the strained conductive configuration, for instance shown in FIG. 10C, to the fractured non-conductive configuration (shown in FIG. 10D) without interference through engagement, friction, and the like with the breaker housing 1300.

In one example, the breaker housing 1300 incorporates thermal insulation such as the thermal insulator 1028 shown in FIGS. 10C and 10D. The thermal insulation substantially prevents the transition of the shape memory substrates 1000 through exposure to high temperatures and environments, for instance within equipment assemblies including internal combustion engines, electrical components and the like that operate at elevated temperatures that might otherwise trigger the shape memory substrates 1000 without a corresponding overload current or voltage. In another example, the breaker housing 1300 does not include thermal insulation. Instead, the breaker housing 1300 is a housing containing components similar to the thermo-electro circuit breaker 1218 shown in FIG. 12. Stated another way, the shape memory circuit breakers incorporated within the breaker housing 1300 (e.g., the plurality of shape memory substrates 1000) are configured to transition and thereby fracture according to elevated temperatures in the environment as well as overload currents or voltages that elevate the temperature of the shape memory substrates 1000 through resistive heating of the substrates.

Figure 14A:
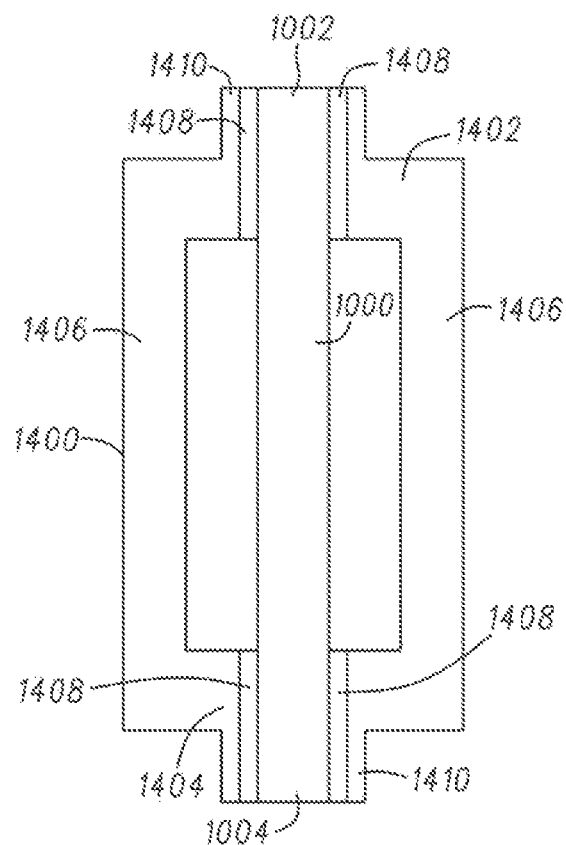
FIG. 14A illustrates a shape memory circuit breaker configured for removable positioning within a breaker housing.

Referring now to FIG. 14A, one example of a shape memory circuit breaker 1400 for removable positioning within a breaker housing is provided. The shape memory circuit breaker 1400 is similar in at least some regards to the shape memory circuit breaker 1010 shown in FIGS. 10C and 10D. For instance, the shape memory circuit breaker 1400 includes a shape memory substrate 1000 configured to transition to a fractured non-conductive configuration as shown in FIG. 10D when exposed to a specified temperature or range of temperatures. For instance, the shape memory substrate 1000 is configured to transition to the fractured temperature when overload currents or voltages (or ranges of the same) are applied across the shape memory substrate 1000 and elevate the temperature of the substrate 1000 at or above a specified transition temperature (or temperatures). Further, the shape memory circuit breaker 1400 includes first and second anchors 1402, 1404 configured to engage with and statically position the first and second substrate ends 1002, 1004 of the shape memory substrate 1000. The first and second anchors 1402, 1404 are positioned statically relative to one another with braces 1406 extending therebetween. In one example, an electrical insulator 1408 is incorporated into the first and second anchors 1402, 1404 and thereby substantially prevents the transmission of electricity through the braces 1406.

The shape memory circuit breaker 1400 as previously described is configured for removable positioning within a breaker housing. As shown in FIG. 14A, the shape memory circuit breaker 1400 includes a terminal fitting 1410 formed around each of the first and second substrate ends 1002, 1004. In one example, the terminal fittings 1410 are sized and shaped for reception within corresponding recesses in the breaker housing. Engagement of the terminal fittings 1410 with the breaker housing reliably fits and engages the shape memory circuit breaker 1400 within the breaker housing thereby ensuring reliable electrical contact between terminals of the breaker housing and the first and second substrate ends 1002, 1004. In one example, the terminal fitting 1410 is constructed with the same material as one or more of the first and second anchors 1402, 1404 and the braces 1406. Optionally, the shape memory circuit breaker 1400 further includes a thermal insulator such as the thermal insulator 1028 shown in FIGS. 10C and 10D. The thermal insulator is provided with the shape memory circuit breaker 1400 to substantially insulate the shape memory substrate 1000 from exterior environmental temperatures. Stated another way, in one example where transition of the shape memory substrate 1000 according to exterior elevated environmental temperatures is not desired the thermal insulator substantially prevents such transition and instead ensures the shape memory substrate 1000 of the shape memory circuit breaker 1400 operates according to overload currents or voltages (or ranges of the same).

Figure 14B:
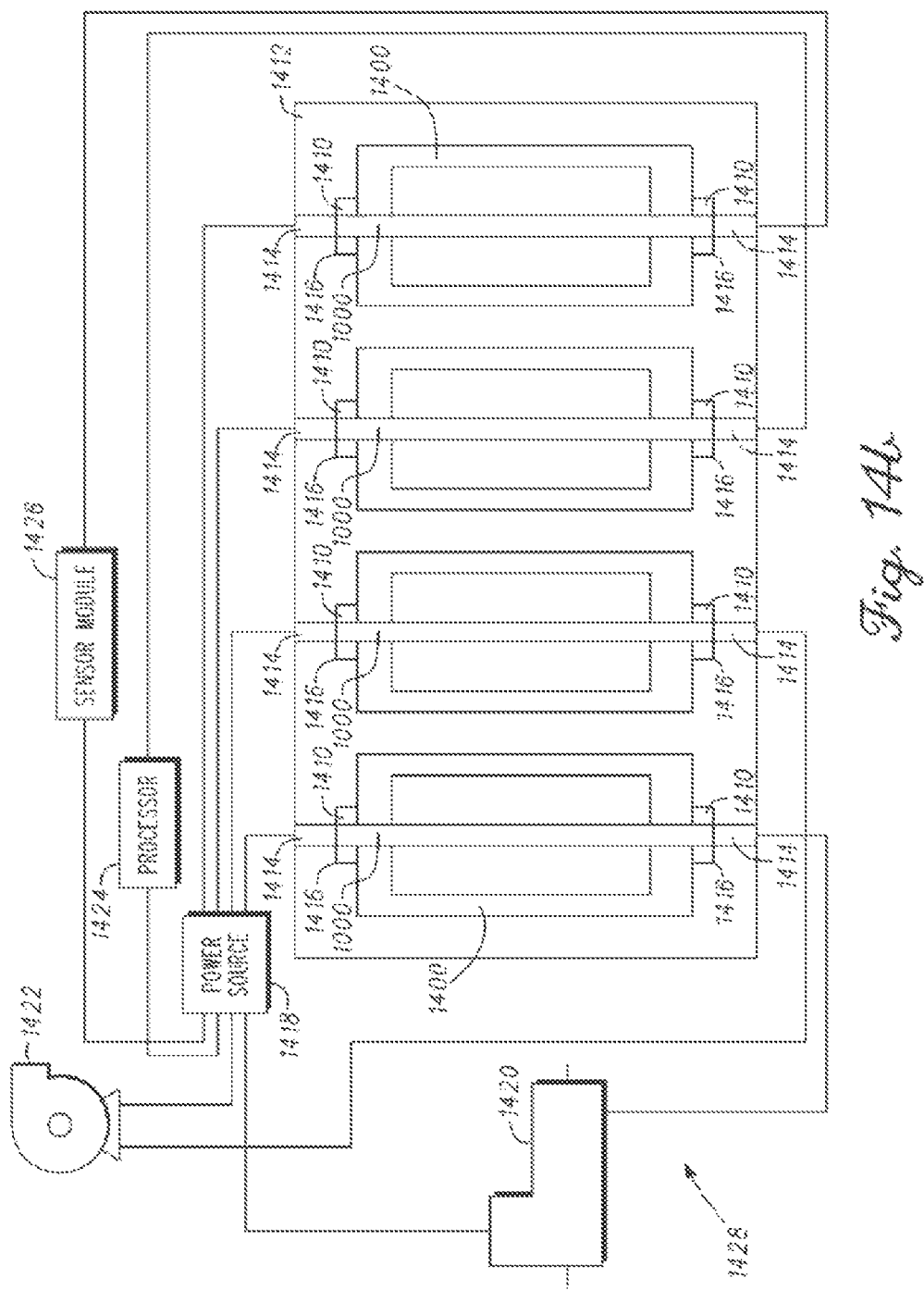
FIG. 14B illustrates an equipment assembly including a plurality of electrically operated components, a breaker housing, and a plurality of shape memory circuit breakers in the breaker housing.

Referring now to FIG. 14B, one example of a breaker housing 1412 is shown configured for reception of a plurality of shape memory circuit breakers, such as the shape memory circuit breakers 1400 shown in FIG. 14A. As shown the breaker housing 1412 includes a plurality of terminals 1414 configured for electrical coupling with the first and second substrate ends 1002, 1004 of the shape memory circuit breakers 1400. In one example, the breaker housing 1412 includes fitting recesses 1416 sized and shaped to receive the terminal fittings 1410 of the plurality of shape memory circuit breakers 1400. The shape memory circuit breakers 1400 are thereby easily and readily positioned within the breaker housing 1412 and exchanged for unfractured shape memory circuit breakers 1400 after fracturing of a preceding shape memory substrate 1000 in a shape memory circuit breaker 1400.

In one example, the breaker housing 1412 is incorporated within an equipment assembly such as the equipment assembly 1428 including one or more electrically operated components. For instance, the breaker housing 1412 is incorporated as part of a control panel, a control box, or another portion of the equipment assembly 1428. In the example shown in FIG. 14B, the plurality of shape memory circuit breakers 1400 are electrically coupled with a plurality of corresponding closed circuits including the electrically operated components described herein. For instance, as shown in FIG. 14B, in one example the equipment assembly 1428 includes a compressor 1420, and pump 1422, a processor, computer or other electronic device 1424, and a sensor module 1426. In another example, the equipment assembly 1428 includes additional or fewer electrically operated components. As shown in FIG. 14B, each of the electrically operated components 1420-1426 is electrically coupled with a power source 1418 and one of the shape memory circuit breakers 1400 within the breaker housing 1412. Each of the shape memory circuit breakers 1400 associated with each of the electrically operated components of the equipment assembly 1428 are configured to separately fracture when subject to one or more of overload currents or voltages (or ranges of currents or voltages). When an overload current or voltage is applied across the shape memory substrate 1000 for one or more of the shape memory circuit breakers 1400, the shape memory substrate 1000 fractures as shown in FIG. 10D thereby interrupting power to the corresponding electrically operated component (one or more of the components 1420-1426). After fracture of the shape memory substrate 1000 into the fractured non-conductive configuration 1030 (see FIG. 10D) the fractured shape memory circuit breaker 1400 is exchanged with a new shape memory circuit breaker 1400 in the breaker housing 1412 and delivery of power to the respective component 1420, 1426 is thereby restored.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the invention may lie in less than all features of a single disclosed embodiment. Thus the following claims are hereby incorporated into the detailed description, with each claim standing on its own as a separate preferred embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

CONCLUSION

A system and method are provided for a shape memory circuit breaker that fractures when subject to a specified range of currents or voltages (e.g., for instance a specified overload current or voltage) that generate a corresponding specified range of temperatures (e.g., a specified transition temperature) in the shape memory substrate of the circuit breaker. The specified range of temperatures includes, for instance, a specified transition temperature of the shape memory substrate corresponding to a specified overload current or overload voltage. The shape memory substrate is tunable to ensure the substrate only operates at a specified combination of temperature (including a range temperatures) and corresponding current or voltage (or ranges of either or both). For instance, the material, stress, strain, thermal and mechanical conditioning of the material as well as its thickness and width are chosen to ensure the shape memory substrate reliably operates at a precise transition temperature corresponding to one or more of a specified overload current or specified overload voltage.

The shape memory circuit breaker does not sublimate. Instead, the shape memory substrate is constructed with a shape memory material having a transition temperature below the temperature required for sublimation. Even with the current and voltage fluctuations the temperature of the shape memory substrate does not approach a temperature sufficient to cause sublimation. The shape memory substrate is thereby maintained throughout the operational lifetime of the shape memory circuit breaker and the specified range of currents or voltages that cause fracture of the shape memory substrate is also accordingly maintained. Accurate and reliable interruption of electrical power to components and equipment assemblies including the circuit breaker is thereby provided over the entire lifetime of the shape memory substrate prior to fracture.

Further, as described herein the shape memory substrate fractures. Upon fracture the fractured ends of the shape memory substrate withdraw from the initial fracture location toward the opposed first and second substrate ends of the shape memory substrate. For instance, the shape memory substrate is strained 8 to 10 percent of the overall length of the shape memory substrate. Upon fracturing the fractured ends resume an unstrained configuration and withdraw from the fracture location thereby providing an open span substantially equivalent to the length added to the shape memory substrate when strained. The withdrawal of the fractured ends substantially prevents arcing between the first and second substrate ends and thereby prevents the generation of radio frequency interference that may interfere with or damage sensitive components. Moreover, because the shape memory substrate fractures instead of melting as with prior art fuses there is no plasma within the shape memory circuit breaker to facilitate arcing between the substrate ends.

What is claimed is:

1. A shape memory substrate circuit breaker comprising:
   a shape memory substrate mechanically coupled and providing an electrically conductive path between first and second anchors;
   an isolation housing including an isolation cavity having the shape memory substrate within the isolation cavity, the isolation housing operating as a thermal barrier to substantially prevent heating of the shape memory substrate by a heat source separate from the shape memory substrate and outside the isolation housing;
   wherein the shape memory substrate transitions between a strained, electrically conductive configuration and a fractured, electrically nonconductive configuration when an overload current or overload voltage is applied across the shape memory substrate:
      in the strained electrically conductive configuration the shape memory substrate continuously and linearly extends between the first and second anchors, and the shape memory substrate is an electrically conductive pathway between the first and second anchors, and
      in the fractured electrically nonconductive configuration the shape memory substrate extends linearly in a discontinuous broken line and includes a nonconductive gap between the first and second anchors; and
   an equipment housing including an equipment assembly, the first and second anchors and the shape memory substrate, and wherein the equipment assembly is electrically coupled in series with the shape memory substrate, and the equipment assembly is configured to operate at specified currents and voltages, and the equipment assembly is damageable by the overload current or the overload voltage greater than the specified currents and voltages, respectively.

2. The shape memory circuit breaker of claim 1, wherein the first and second anchors are electrically insulated from the shape memory substrate.

3. The shape memory circuit breaker of claim 2, wherein the first and second anchors include insulated jaws engaged against first and second substrate ends of the shape memory substrate, respectively.

4. The shape memory circuit breaker of claim 1 comprising a brace coupled between the first and second anchors, and the isolation housing includes the brace.

5. The shape memory circuit breaker of claim 1, wherein in the strained electrically conductive configuration first and second substrate ends of the shape memory substrate include opposed fractured ends adjacent a fracture location, and in the fractured electrically nonconductive configuration the opposed fractured ends are positioned remotely from each other.

6. The shape memory circuit breaker of claim 5, wherein the opposed fracture ends are positioned a fracture length from each other in the fractured electrically nonconductive configuration, and the fracture length is around 8 to 10 percent of a total length of the shape memory substrate between the first and second substrate ends.

7. The shape memory circuit breaker of claim 1, wherein the shape memory substrate is a nickel-titanium alloy.

8. A method of protecting an equipment assembly from an electrical overload comprising:
operating an equipment assembly electrically coupled in series with a linear, continuous and reactive shape memory substrate, the equipment assembly configured to operate at specified currents and voltages supplied across the shape memory substrate, and the equipment assembly is damageable by an overload current or an overload voltage greater than the specified currents and voltages, respectively;
thermally isolating the shape memory substrate within an isolation housing, he isolation housing operating as a thermal barrier to substantially prevent heating of the shape memory substrate by a heat source separate from the shape memory substrate outside of the isolation housing; and
transitioning the linear, continuous and reactive shape memory substrate having a strained electrically conductive state to a linear, fractured and discontinuous shape memory substrate having a fractured electrically nonconductive state when the overload current or overload voltage is supplied across the shape memory substrate, the fractured electrically nonconductive state preventing operation of the equipment assembly.

9. The method of claim 8, wherein thermally isolating the shape memory substrate includes providing a brace between first and second anchors, the first and second anchors engaged with first and second substrate ends of the shape memory substrate.

10. The method of claim 8, wherein transitioning the shape memory substrate includes transitioning from the linear, continuous and reactive shape memory substrate to a linear, fractured and discontinuous shape memory substrate having opposed fractured ends positioned remotely from each other.

11. The method of claim 10, wherein transitioning to the linear, fractured and discontinuous shape memory substrate includes positioning the fractured ends apart a fractured length of around 8 to 10 percent of a total length of the shape memory substrate in the linear, continuous and reactive shape memory substrate.

* * * * *